(12) United States Patent
Kardos et al.

(10) Patent No.: US 8,490,392 B2
(45) Date of Patent: Jul. 23, 2013

(54) ARRANGEMENT FOR A SUPERCHARGED COMBUSTION ENGINE CONCERNING COOLERS FOR INLET AIR TO AND EXHAUST GASES FROM THE ENGINE

(75) Inventors: Zoltan Kardos, Södertälje (SE); Erik Söderberg, Stockholm (SE)

(73) Assignee: Scania CV AB (SE)

( * ) Notice: Subject to any disclaimer, the term of this patent is extended or adjusted under 35 U.S.C. 154(b) by 324 days.

(21) Appl. No.: 12/996,812

(22) PCT Filed: Jun. 3, 2009

(86) PCT No.: PCT/SE2009/050657
§ 371 (c)(1),
(2), (4) Date: Dec. 8, 2010

(87) PCT Pub. No.: WO2009/151378
PCT Pub. Date: Dec. 17, 2009

(65) Prior Publication Data
US 2011/0088668 A1 Apr. 21, 2011

(30) Foreign Application Priority Data
Jun. 9, 2008 (SE) ...................................... 0801347

(51) Int. Cl.
*F02B 29/04* (2006.01)
(52) U.S. Cl.
USPC ............................................ 60/599; 60/605.2
(58) Field of Classification Search
USPC .......................... 60/599, 605.2, 612; 123/564
See application file for complete search history.

(56) References Cited

U.S. PATENT DOCUMENTS

| | | | | |
|---|---|---|---|---|
| 3,355,877 | A * | 12/1967 | Chaffiotte | 60/599 |
| 6,244,256 | B1 * | 6/2001 | Wall et al. | 123/568.12 |
| 6,604,515 | B2 * | 8/2003 | Marsh et al. | 123/563 |
| 7,650,753 | B2 * | 1/2010 | Muller et al. | 60/599 |
| 7,826,958 | B2 * | 11/2010 | Wikstrom | 701/108 |
| 2004/0020204 | A1 * | 2/2004 | Callas et al. | 60/612 |
| 2006/0037590 | A1 * | 2/2006 | Uzkan et al. | 123/563 |
| 2006/0185362 | A1 * | 8/2006 | Rogg et al. | 60/599 |
| 2008/0047267 | A1 * | 2/2008 | Kardos et al. | 60/605.2 |
| 2008/0053090 | A1 * | 3/2008 | Kardos et al. | 60/605.2 |

(Continued)

OTHER PUBLICATIONS

International Search Report dated Sep. 28, 2009, issued in corresponding international application No. PCT/SE2009/050657.

*Primary Examiner* — Kenneth Bomberg
*Assistant Examiner* — Paolo Isada
(74) *Attorney, Agent, or Firm* — Ostrolenk Faber LLP

(57) ABSTRACT

An arrangement for a supercharged combustion engine including a first compressor subjecting air to a first compression step, a second compressor subjecting the air to a second compression step, a first cooling system with a circulating coolant, a second cooling system with a circulating coolant which is at a lower temperature than the coolant in the first cooling system, a first charge air cooler applied to an air inlet line to the engine for cooling compressed air, the first cooler is located between the first compressor and the second compressor and is cooled by coolant from the second cooling system, a second charge air cooler applied to the air inlet line at a location downstream of the second compressor and is cooled by coolant from the first cooling system, and a third charge air cooler applied at a location downstream of the second charge air cooler and cooled by coolant from the second cooling system.

10 Claims, 2 Drawing Sheets

U.S. PATENT DOCUMENTS

| | | | |
|---|---|---|---|
| 2008/0066697 A1* | 3/2008 | Raab et al. | 123/41.55 |
| 2008/0087238 A1* | 4/2008 | Held et al. | 123/41.48 |
| 2008/0092861 A1* | 4/2008 | Duffy et al. | 123/568.12 |
| 2008/0190108 A1* | 8/2008 | Eitel et al. | 60/605.2 |
| 2008/0190109 A1* | 8/2008 | Kardos et al. | 60/605.2 |
| 2008/0256949 A1* | 10/2008 | Wikstrom et al. | 60/605.2 |
| 2008/0271451 A1* | 11/2008 | Kardos et al. | 60/605.2 |
| 2009/0159021 A1* | 6/2009 | Kardos | 123/41.12 |
| 2009/0277722 A1* | 11/2009 | Kardos | 184/6.12 |
| 2009/0320467 A1* | 12/2009 | Kardos et al. | 60/605.2 |
| 2010/0006043 A1* | 1/2010 | Kardos et al. | 123/41.01 |
| 2010/0065024 A1* | 3/2010 | Kardos et al. | 123/540 |
| 2010/0263369 A1* | 10/2010 | Kardos et al. | 60/599 |
| 2011/0000446 A1* | 1/2011 | Kardos et al. | 123/41.02 |
| 2011/0000469 A1* | 1/2011 | Lauberts et al. | 123/564 |
| 2011/0005475 A1* | 1/2011 | Kardos et al. | 123/41.08 |
| 2011/0041814 A1* | 2/2011 | Kardos et al. | 123/563 |
| 2011/0139131 A1* | 6/2011 | Kardos et al. | 123/542 |

* cited by examiner

ARRANGEMENT FOR A SUPERCHARGED COMBUSTION ENGINE CONCERNING COOLERS FOR INLET AIR TO AND EXHAUST GASES FROM THE ENGINE

CROSS-REFERENCE TO RELATED APPLICATIONS

The present application is a 35 U.S.C. §§371 national phase conversion of PCT/SE2009/050657, filed Jun. 3, 2009, which claims priority of Swedish Application No. 0801347-6 filed Jun. 9, 2008, the contents of which are incorporated by reference herein. The PCT International Application was published in the English language.

BACKGROUND TO THE INVENTION, AND STATE OF THE ART

The present invention relates to an arrangement for a supercharged combustion engine and particularly to change air coolers for cooling compressed air which is led to the engine.

The amount of air which can be supplied to a supercharged combustion engine depends not only on the pressure of the air but also on the temperature of the air. Supplying the largest possible amount of air to a combustion engine entails the air having first to be compressed to a high pressure and thereafter to be cooled before it is led to the combustion engine. When air needs compressing to high pressure, it is advantageous that it be compressed in two stages. This may involve a compressor of a first turbo unit subjecting the air to a first compression step and a compressor in a second turbo unit subjecting the air to a second compression step. Cooling the air between the two compression steps is a known practice. The cooling of the air after it has undergone the first compression step leads to the air being at a lower temperature. The air will thus be at a lower specific volume, i.e. it will occupy a smaller volume per unit weight. As a compressor usually has a space with a constant volume in which to receive and compress air, such intermediate cooling makes it possible for a larger amount of air to be drawn into the second compressor and subjected to the second compression step. This means that a large amount of air can be compressed to a high pressure. It is also important to cool the compressed air before it is led to the combustion engine, so that a large amount of the compressed air can be led into the combustion engine.

SUMMARY OF THE INVENTION

The object of the present invention is to provide an arrangement for a supercharged combustion engine which results in effective cooling of compressed air which is led to the combustion engine even when the air is compressed to a very high pressure.

This object is achieved with the arrangement of the invention. When air is compressed, it undergoes an amount of heating which is related to the degree of compression. This means that air which is compressed to high pressure undergoes very powerful heating. In such cases, the air is therefore compressed in two stages with an intermediate cooling. Coolant from a second cooling system is here used for cooling the charge air between the compression steps. The fact that the coolant in the second cooling system is at a lower temperature than the coolant in a first system makes effective cooling of the charge air possible between the compressions. Such compression in two stages with an intermediate cooling leads to the efficiency of the compression being considerably higher than if the compression was effected in one step. The intercooling results in the air after the second compression step being at a significantly lower temperature than if it was subjected in a conventional manner to only one compression step. The lower temperature of the air after the compression means that components for receiving and conveying the compressed air need not be made of relatively expensive materials with good heat tolerance characteristics. After the compression of the air, it is cooled first by coolant from the first system and thereafter by coolant from the second cooling system. Cooling the compressed air first with the warmer coolant in the first cooling system makes it unnecessary for the second cooling system to effect the whole cooling of the charge air. The load on the second cooling system will thus be smaller and the temperature of the coolant can therefore be kept at a low level. The low temperature of the coolant in the second cooling system ensures that the charge air is cooled to a low temperature before it is led into the combustion engine.

According to a preferred embodiment of the invention, the first cooling system comprises a first radiator in which the coolant is intended to be cooled by air. Such a radiator may be arranged at a suitable location, e.g. in a vehicle, where it has a cooling air flow passing through it. The first cooling system comprises with advantage an extra radiator in which the coolant is intended to be cooled by air. Particularly in vehicles, the load on existing cooling systems may become severe. In many cases it is therefore advantageous to provide such an extra air-cooled radiator at a suitable location in the vehicle. The extra radiator and the first radiator are preferably arranged in parallel in the first cooling system. Thus part of the coolant will be cooled in the first radiator and the remainder of the coolant will be cooled in the extra cooler. After the cooling, the coolant from the various coolers may be brought together and mixed before the coolant is used again for cooling. The first cooling system is preferably intended to cool the combustion engine. It is advantageous to use the coolant in this existing cooling system for subjecting the compressed air to a first step of cooling after the second compression. During normal operation, this coolant will certainly be at a temperature of 80-100° C. but this is definitely lower than the temperature of the compressed air after it has undergone the second compression step.

According to a preferred embodiment of the invention, the second cooling system comprises a radiator element in which the coolant is intended to be cooled by air at the temperature of the surroundings. For the coolant in the second cooling system to acquire a low temperature, it is advantageous to cause it to be cooled in a radiator element which has air at the temperature of the surroundings flowing through it. By suitable dimensioning of the radiator element it is therefore possible also to cool the coolant to a temperature close to the temperature of the surroundings. The second cooling system may comprise a line adapted to leading coolant to a first charge air cooler and a line adapted to leading coolant to a third charge air cooler, which lines are arranged in parallel so that they lead coolant at substantially the same temperature to the respective charge air coolers. Such parallel lines make it possible for the compressed air to be cooled by coolant at the same low temperature. The air can thus be cooled to an optimum low temperature between the compression steps and before it is led into the combustion engine. The second cooling system may comprise at least one further parallel line which leads coolant to a further radiator. In a vehicle, for example, there are a large number of components and media which it is advantageous to cool by means of coolant at a low temperature, e.g. electrical control units, refrigerants in air conditioning systems and gearbox oil.

According to another preferred embodiment of the invention, the arrangement comprises a return line connecting the exhaust line to the inlet line so that it is possible, via the return line, to recirculate exhaust gases from the exhaust line to the inlet line. The technique known as EGR (Exhaust Gas Recirculation) is a known way of recirculating part of the exhaust gases from a combustion process in a combustion engine. The recirculating exhaust gases are mixed with the inlet air to the combustion engine before the mixture is led to the engine's cylinders. Adding exhaust gases to the air causes a lower combustion temperature which results inter alia in a reduced content of nitrogen oxides NOx in the exhaust gases. Supplying a large amount of exhaust gases to the combustion engine also requires effective cooling of the exhaust gases before they are led to the combustion engine. The return line may comprise a first EGR cooler adapted to be cooled by coolant from the first cooling system and a second EGR cooler adapted to be cooled by coolant from the second cooling system. The exhaust gases can thus undergo cooling to the same low temperature as the inlet air before they mix and are led into the combustion engine.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
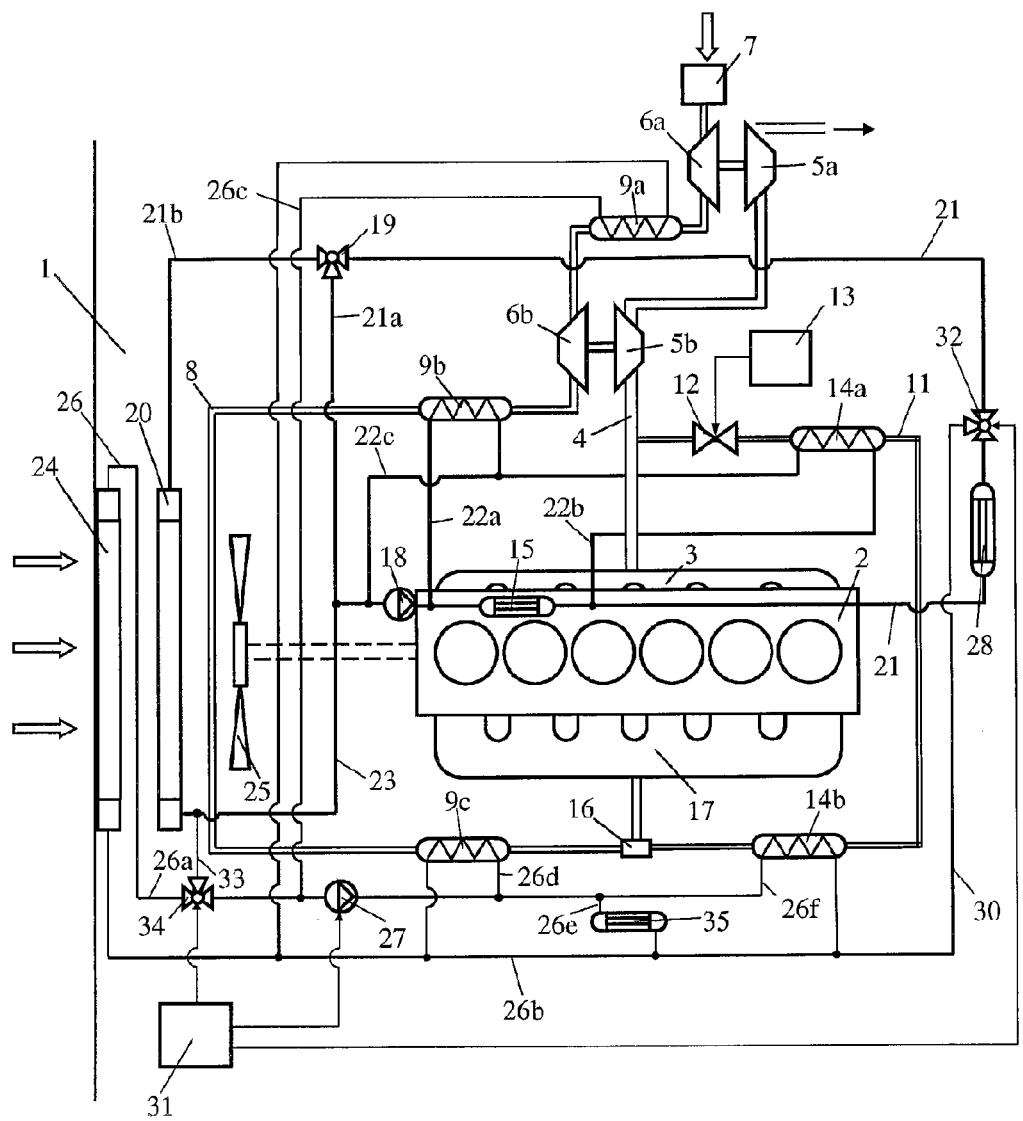
FIG. 1 depicts an arrangement for a supercharged diesel engine according to a first embodiment of the invention and FIG. 2 depicts an arrangement for a supercharged diesel engine according to a second embodiment of the invention.

FIG. 1 depicts an arrangement for a supercharged combustion engine intended to power a schematically depicted vehicle 1. The combustion engine is here exemplified as a diesel engine 2. The diesel engine 2 may be used to power a heavy vehicle 1. The diesel engine 2 is cooled by a first cooling system with a circulating coolant. The exhaust gases from the cylinders of the diesel engine 2 are led via an exhaust manifold 3 to an exhaust line 4. The diesel engine 2 is provided with a first turbo unit comprising a turbine 5a and a compressor 6a, and a second turbo unit comprising a turbine 5b and a compressor 6b. The exhaust gases in the exhaust line 4, which are at above atmospheric pressure, are led initially to the turbine 5b of the second turbo unit. The turbine 5b is thus provided with driving power which is transferred, via a connection, to the compressor 6b of the second turbo unit. The exhaust gases are thereafter led via the exhaust line 4 to the turbine 5a of the first turbo unit. The turbine 5a is thus provided with driving power which is transferred, via a connection, to the compressor 6a of the first turbo unit.

The arrangement comprises an inlet line 8 adapted to lead air to the combustion engine 2. The compressor 6a of the first turbo unit compresses air which is drawn into the inlet line 8 via an air filter 7. The air is cooled thereafter in a first charge air cooler 9a by coolant from a second cooling system. The second cooling system contains coolant which during normal operation is at a lower temperature than the temperature of the coolant in the combustion engine's cooling system. The compressed and cooled air leaving the first charge air cooler 9a is led on in the line 8 to the compressor 6b of the second turbo unit, in which it undergoes a second compression step. The air is thereafter led via the line 8 to a second charge air cooler 9b in which it is cooled by coolant from the combustion engine's cooling system. The charge air is finally cooled in a third charge air cooler 9c, in which it is cooled by the cold coolant in the second cooling system.

The arrangement comprises a return line 11 for recirculation of exhaust gases from the exhaust line 4. The return line 11 has an extent between the exhaust line 4 and the inlet line 8. The return line 11 comprises an EGR valve 12 by which the exhaust flow in the return line 11 can be shut off. The EGR valve 12 can also be used for steplessly controlling the amount of exhaust gases which is led from the exhaust line 4 to the inlet line 8 via the return line 11. A first control unit 13 is adapted to control the EGR valve 12 on the basis of information about the current operating state of the diesel engine 2. The return line 11 comprises a coolant-cooled first EGR cooler 14a for subjecting the exhaust gases to a first step of cooling. The exhaust gases are cooled in the first EGR cooler 14a by coolant from the combustion engine's cooling system. The exhaust gases are thereafter subjected to a second step of cooling in a coolant-cooled second EGR cooler 14b. The exhaust gases are cooled in the second EGR cooler 14b by coolant from the second cooling system.

In certain operating situations in supercharged diesel engines 2, the pressure of the exhaust gases in the exhaust line 4 will be lower than the pressure of the compressed air in the inlet line 8. In such operating situations it is not possible to mix the exhaust gases in the return line 11 directly with the compressed air in the inlet line 8 without special auxiliary means. To this end it is possible to use, for example, a venturi 16 or a turbo unit with variable geometry. If instead the combustion engine 2 is a supercharged Otto engine, the exhaust gases in the return line 11 can be led directly into the inlet line 8, since the exhaust gases in the exhaust line 4 of an Otto engine in substantially all operating situations will be at a higher pressure than the compressed air in the inlet line 8. After the exhaust gases have mixed with the compressed air in the inlet line 8, the mixture is led to the respective cylinders of the diesel engine 2 via a manifold 17.

The combustion engine 2 is cooled in a conventional manner by coolant which is circulated in the first cooling system. The coolant in the first cooling system is circulated by a coolant pump 18. The main flow of coolant cools the combustion engine 2. In this case the coolant also cools motor oil in an oil cooler 15. After the coolant has cooled the combustion engine 2, it is led in a line 21 to an oil cooler element 28 for a retarder. After the coolant has cooled the oil in the oil cooler element 28, it is led on in the line 21 to a thermostat 19. The thermostat 19 leads a variable amount of the coolant to a line 21a and a line 21b depending on the temperature of the coolant. The line 21a leads coolant to the combustion engine 2, whereas the line 21b leads coolant to a radiator 20 fitted at a forward portion of the vehicle 1. When the coolant has reached a normal operating temperature, substantially all of the coolant is led to the radiator 20 in order to be cooled. A line 23 leads the cooled coolant back to the combustion engine 2. A small portion of the coolant in the cooling system is not used to cool the combustion engine but is led into two parallel lines 22a, 22b. The line 22a leads coolant to the second charge air cooler 9b, in which it cools the compressed air. The line 22b leads coolant to the first EGR cooler 14a, in which it subjects the recirculating exhaust gases to a first step of cooling. The coolant which has cooled the air in the second charge air cooler 9b and the coolant which has cooled the exhaust gases in the first EGR cooler 14a are reunited in a line 22c. The line 22c leads the coolant to a location in the cooling system which is situated between the thermostat 19, which is a three-way valve, and the pump 18, where it is mixed with cooled coolant from the radiator 20.

The second cooling system comprises a radiator element 24 fitted in front of the radiator 20 in a peripheral region of the vehicle 1. In this case the peripheral region is situated at a front portion of the vehicle 1. A radiator fan 25 is adapted to generate a flow of surrounding air through the radiator element 24 and the radiator 20. As the radiator element 24 is situated in front of the radiator 20, the coolant is cooled in the radiator element 24 by air at the temperature of the surroundings. The coolant in the radiator element 24 can thus be cooled to a temperature close to the temperature of the surroundings. The cold coolant from the radiator element 24 is circulated in the second cooling system in a line circuit 26 by a pump 27. The line circuit 26 comprises a first line 26a which leads cold coolant out from the radiator element 24 to various coolers for cooling various media. The line circuit 26 comprises a second line 26b which leads the coolant back to the radiator element after it has been used for cooling said media.

A first connecting line 30 connects the second cooling system to the combustion engine's cooling system. The first connecting line 30 has one end connected to the second line 26b of the second cooling system and an opposite end connected to the line 21 of the first cooling system. The first connecting line 30 is connected to the line 21 via a first three-way valve 32. The coolant in the combustion engine's cooling system is at its highest temperature in the line 21 close to the first three-way valve 32. A second connecting line 33 connects the second cooling system to the first cooling system. The second connecting line 33 is connected to the first line 26a of the second cooling system via a second three-way valve 34. The second three-way valve 34 is arranged in the line 26a at a location where the coolant has just been cooled in the radiator 24. The first line 26a divides into a number of parallel lines 26c-f which lead cold coolant to a number of coolers 9a, 9c, 14b, 35 for cooling various media. The line 26c is adapted to lead cold coolant to the first charge air cooler 9a, in which it subjects the compressed air to an initial step of cooling. The line 26d is adapted to lead cold coolant to the third charge air cooler 9c, in which it subjects the compressed air to a final step of cooling. The line 26e is adapted to leading cold coolant to a cooler 35 which may be of any desired kind. The cooler 35 may for example be adapted to cool a cooling medium which cools electrical control units, a refrigerant in an air conditioning system or gearbox oil. The line 26f is adapted to lead cold coolant to the second EGR cooler 14b, in which it subjects the recirculating exhaust gases to a second step of cooling. After the coolant has passed through said coolers 9a, 9c, 14b, 35, the warmed coolant is led back to the radiator 24 via the line 26b. A second control unit 31 is adapted to control the three-way valves 32, 34.

During operation of the diesel engine 2, exhaust gases flow through the exhaust line 4 and drive the turbines 5a, b of the turbo units. The turbines 5a, b are thus provided with driving power which drives the compressors 6a, 6b of the turbo units. The compressor 6a of the first turbo unit draws surrounding air in via the air filter 7 and subjects the air in the inlet line 8 to a first compression step. The air thus acquires an increased pressure and an increased temperature. The compressed air is cooled in the first charge air cooler 9a by the coolant in the second cooling system. In favourable circumstances, the coolant in the second cooling system may be at a temperature substantially corresponding to the temperature of the surroundings when it reaches the first charge air cooler 9a. The compressed air can thus be cooled to a temperature close to the temperature of the surroundings in the first charge air cooler 9a. The cooled air maintains its pressure in the first charge air cooler 9a. Air which is cooled has a lower specific volume, i.e. it occupies a smaller volume per unit weight. The air thus becomes more compact. A compressor normally has a space with a constant volume in which to receive and compress air. The cooling of the air in the first charge air cooler 9a thus makes it possible for a larger amount of air to be compressed in the compressor 6b of the second turbo unit. The air is here subjected to a second compression step to a still higher pressure. The compressed air is thereafter led through the second charge air cooler 9b, in which it is cooled by coolant from the combustion engine's cooling system. The compressed air may here be cooled to a temperature close to the temperature of the coolant in the combustion engine's cooling system. The compressed air is thereafter led to the third charge air cooler 9c, in which it is cooled by coolant from the second cooling system. The compressed air may here be cooled to a temperature close to the temperature of the surroundings.

In most operating states of the diesel engine 2, the control unit 13 will keep the EGR valve 12 open so that part of the exhaust gases in the exhaust line 4 is led into the return line 11. The exhaust gases in the exhaust line 4 may be at a temperature of about 500-600° C. when they reach the first EGR cooler 14a. The recirculating exhaust gases undergo a first step of cooling in the first EGR cooler 14a. The coolant in the combustion engine's cooling system is here used as cooling medium. During normal operation of the vehicle, this coolant will be at a temperature within the range 70-100° C. The recirculating exhaust gases can thus undergo a first step of cooling to a temperature close to the temperature of the coolant. The exhaust gases are thereafter led to the second EGR cooler 14b. The second EGR cooler 14b is cooled by coolant from the second cooling system. With a suitably dimensioned EGR cooler 14b, the recirculating exhaust gases can be cooled to a temperature close to the temperature of the surroundings. Exhaust gases in the return line 11 can thus undergo cooling to substantially the same temperature as the compressed air in the third charge air cooler 9c.

The compressed air is thus subjected to three steps of cooling. Cooling the air between the compressions in the compressors 6a, b results in the air being of relatively low specific volume when it is subjected to the second compression step by the compressor 6b. A relatively large amount of air can therefore be subjected to the second compression step by the compressor 6b. The compressed air is thereafter cooled in the second charge air cooler 9b and the third charge air cooler 9c to a temperature substantially corresponding to the temperature of the surroundings. Both the exhaust gases and the compressed air will thus be at a temperature substantially corresponding to the temperature of the surroundings when they mix. Thus a substantially optimum amount of recirculating exhaust gases and a substantially optimum amount of air can be led into the combustion engine at a high pressure. Combustion in the combustion engine with high performance and optimum reduction of nitrogen oxides in the exhaust gases is thus made possible.

During normal operation, the control unit 31 is adapted to keeping the first three-way valve 32 and the second three-way valve 34 in positions such that no exchange of coolant takes place between the first cooling system and the second cooling system. However, the effective cooling of the compressed air and the recirculating exhaust gases may lead to ice formation in the coolers 9c, 14b. If it receives information which indicates that there is risk of ice formation or that ice has formed within either of the coolers 9c, 14b, the second control unit 31 halts the operation of the pump 27. The second control unit 31 places the first three-way valve 32 in a position such that warm coolant from the combustion engine's cooling system is led to the second cooling system via the first connecting line 30. In the second position, the first three-way valve 32 leads the warm coolant in an opposite direction to the normal direction of flow in the second cooling system. The warm coolant from the combustion engine's cooling system will thus flow in the reverse direction through the third charge air cooler 9c and the second EGR cooler 14b. The warm coolant will quickly melt any ice which has formed within the charge air cooler 9c and/or the second EGR cooler 14b. After a predetermined time or when it receives information which indicates that the ice has melted in the charge air cooler 9c and/or the second EGR cooler 14b, the second control unit 31 will return the three-way valves 32, 34 to their respective first positions. Any ice formation in the charge air cooler 9c and/or the second EGR cooler 14b can thus be eliminated easily and effectively.

The vehicle 1 is in this case equipped with an oil-cooled retarder. The retarder oil is cooled in the oil cooler element 28 by the coolant in the combustion engine's cooling system. The braking capacity of a retarder is usually limited by the ability of the cooling system to cool away the thermal energy which is generated when the retarder is activated. The second control unit 31 is adapted to receive information when the retarder is activated. When this occurs, the second control unit 31 switches off the pump 27 in the second cooling system. The second control unit also places the three-way valves 32, 34 in a third position. The first three-way valve 32 thereupon leads warm coolant from the combustion engine's cooling system to the second cooling system via the first connecting line 30. In this case the first three-way valve 32 leads the warm coolant in so that it is circulated in the normal direction of flow in the second cooling system. The warm coolant is led from the first three-way valve 32 to the radiator element 24, in which it is cooled by air at the temperature of the surroundings. The coolant undergoes effective cooling here before it is led to the second three-way valve 34 via the line 26a. The second three-way valve 34, which has thus also been placed in a third position, leads the coolant back to the combustion engine's cooling system via the first connecting line 33. During activation of the retarder, coolant which has cooled the oil in the oil cooler 28 is thus led partly to the combustion engine's radiator 20 and partly to the second cooling system's radiator element 24. This means that the coolant undergoes considerably improved cooling when the retarder is activated. The result is that the retarder can be activated for a significantly longer time before the coolant reaches a maximum acceptable temperature.

Figure 2:
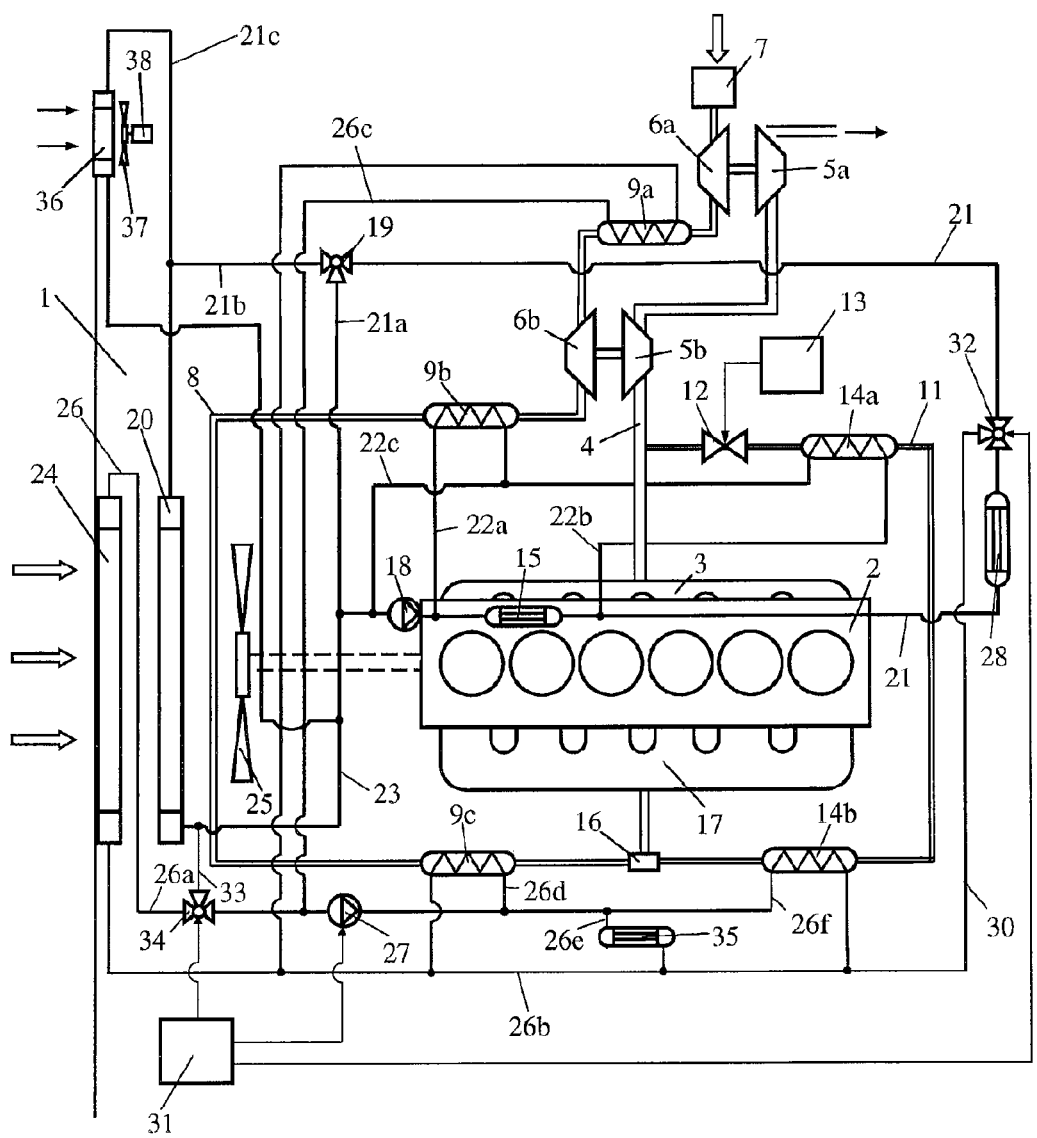

FIG. 2 depicts an alternative embodiment in which the first cooling system is provided with an extra radiator 36 fitted in a peripheral region of the vehicle 1. A radiator fan 37 is provided to generate a flow of surrounding air through the radiator 36. The cooling fan 37 is driven by an electric motor 38. The coolant is cooled in the radiator 36 by air at the temperature of the surroundings. Part of the coolant which circulates in the line 21b will thus be led through the radiator 36, while a remaining portion of the coolant is cooled in the radiator 20. The portion of the coolant which is cooled in the radiator 36 is led to the line 23 in the first cooling system. The extra radiator 36 is here arranged in parallel relative to the ordinary radiator 20.

The invention is in no way limited to the embodiment described with reference to the drawing but may be varied freely within the scopes of the claims.

The invention claimed is:

1. An arrangement for supplying compressed air to a supercharged combustion engine of a vehicle, the arrangement comprising:

an inlet line configured to lead air at above atmospheric pressure to the combustion engine;

a first compressor at the inlet line and configured to subject the air in the inlet line to a first compression step;

a second compressor at the inlet line downstream in air flow direction from the first compressor and configured to subject the air in the inlet line to a second compression step;

a first cooling system having a first circulating coolant circulating through the first cooling system; and a second cooling system having a second circulating coolant circulating through the second cooling system, the first cooling system and the second cooling system being configured and operable so that during normal operation of the combustion engine, the second coolant in the second cooling system is at a lower temperature than the first coolant in the first cooling system;

a first charge air cooler applied at the inlet line at a location between the first compressor and the second compressor, and the first charge air cooler is configured, connected and operable to be cooled by the second coolant from the second cooling system;

a second charge air cooler applied at the inlet line at a location downstream of the second compressor in the air flow direction of the inlet line and the second charge air cooler is configured and operable to be cooled by the first coolant from the first cooling system; and a third charge air cooler applied at the inlet line at a position downstream of the second charge air cooler in the air flow direction of the inlet line and the third charge air cooler is configured, connected and operable to be cooled by the second coolant from the second cooling system.

2. The arrangement according to claim 1, wherein the first cooling system comprises a first radiator configured and located so that the first coolant is cooled by air at the first radiator.

3. The arrangement according to claim 2, wherein the first cooling system comprises an extra radiator in which the first coolant is cooled by air at the extra radiator.

4. The arrangement according to claim 3, wherein the extra radiator and the first radiator are arranged in parallel in the first cooling system.

5. The arrangement according to claim 1, wherein the first cooling system is connected to and configured to cool the combustion engine.

6. The arrangement according to claim 1, wherein the second cooling system comprises a radiator element configured and located so that the second coolant is cooled in the radiator element by air at the temperature of the surroundings.

7. The arrangement according to claim 1, wherein the second cooling system comprises a first line configured, connected and operable to lead the second coolant to the first charge air cooler and a second line configured, connected and operable to lead coolant to the third charge air cooler, the first and second lines being arranged in parallel so that they lead coolant at the same temperature to the respective first and third charge air coolers.

8. The arrangement according to claim 7, further comprising a further cooler for cooling a cooling medium which cools at least one component of the vehicle other than the combustion engine or for cooling at least one medium circulating in the vehicle other than the air in the inlet line, and the second cooling system comprises a further line parallel to the first and second lines, the further line being configured, connected and operable to lead coolant to the further cooler.

9. The arrangement according to claim 1, wherein the combustion engine has an exhaust line for engine exhaust and a return line connecting the exhaust line to the inlet line, to recirculate exhaust gases from the exhaust line to the inlet line via the return line.

10. The arrangement according to claim 9, further comprising a first EGR cooler at the return line, the first EGR cooler being configured, connected and operable to be cooled by the first coolant from the first cooling system, and
   a second EGR cooler at the return line, the second EGR cooler being configured, connected and operable to be cooled by the second coolant from the second cooling system.

* * * * *